United States Patent [19]
Treynor

[11] Patent Number: 5,822,759
[45] Date of Patent: Oct. 13, 1998

[54] CACHE SYSTEM

[75] Inventor: Benjamin S. Treynor, Palo Alto, Calif.

[73] Assignee: Versant Object Technology, Menlo Park, Calif.

[21] Appl. No.: 755,391

[22] Filed: Nov. 22, 1996

[51] Int. Cl.[6] .................................................. G06F 12/12
[52] U.S. Cl. ............................................. 711/134; 711/136
[58] Field of Search ..................................... 711/133, 134, 711/136, 118, 159

[56] References Cited

U.S. PATENT DOCUMENTS

| | | | |
|---|---|---|---|
| 3,675,215 | 7/1972 | Arnold et al. ............................ | 711/171 |
| 4,322,795 | 3/1982 | Lange et al. ............................. | 711/136 |
| 4,625,081 | 11/1986 | Lotito et al. ............................. | 379/88 |
| 4,928,239 | 5/1990 | Baum et al. ............................ | 711/136 |
| 5,025,366 | 6/1991 | Baror ...................................... | 711/128 |
| 5,043,885 | 8/1991 | Robinson ............................... | 711/133 |
| 5,113,510 | 5/1992 | Hillis ...................................... | 711/121 |
| 5,146,604 | 9/1992 | Takada .................................... | 711/115 |
| 5,155,835 | 10/1992 | Belsan .................................... | 711/114 |
| 5,175,834 | 12/1992 | Sawai ..................................... | 711/151 |
| 5,218,687 | 6/1993 | Ducousso et al. ....................... | 711/128 |
| 5,261,053 | 11/1993 | Valencia ................................. | 711/133 |
| 5,353,425 | 10/1994 | Malamy et al. ......................... | 711/136 |
| 5,357,623 | 10/1994 | Megory-Cohen ....................... | 711/129 |
| 5,381,539 | 1/1995 | Yanai et al. ............................. | 711/133 |
| 5,386,546 | 1/1995 | Hamaguchi et al. .................... | 711/133 |
| 5,388,013 | 2/1995 | Nakamura ............................... | 360/48 |
| 5,410,653 | 4/1995 | Macon, Jr. et al. ..................... | 711/137 |
| 5,452,440 | 9/1995 | Salsburg ................................. | 711/136 |
| 5,479,642 | 12/1995 | Jarvis ...................................... | 711/144 |
| 5,497,477 | 3/1996 | Trull ....................................... | 711/133 |
| 5,507,005 | 4/1996 | Kojima et al. .......................... | 395/872 |
| 5,526,511 | 6/1996 | Swensen ................................. | 711/134 |
| 5,530,834 | 6/1996 | Colloff ................................... | 711/136 |
| 5,548,740 | 8/1996 | Kiyohara ................................ | 711/100 |
| 5,555,393 | 9/1996 | Tanaka ................................... | 711/133 |
| 5,594,886 | 1/1997 | Smith ..................................... | 711/136 |
| 5,664,217 | 9/1997 | Cunningham .......................... | 395/821 |
| 5,737,752 | 4/1998 | Hilditch ................................. | 711/133 |

Primary Examiner—Tod R. Swann
Assistant Examiner—Christopher S. Chow
Attorney, Agent, or Firm—Sheldon & Mak

[57] ABSTRACT

A cache memory system maintains an ordered linked list of cache items having scores that are positively correlated with frequencies of access and negatively correlated with a size that is determined as a number of bytes of each item plus an overhead associated with the linked list. In addition to data and linking pointers, the list segments each include a hit count and a byte count. In a method for managing cache memory forms the linked list by adding segments for newly requested data and deleting data having lowest scores. Upon a cache miss, a new list segment that is created for the requested data is positioned in the list by comparison with scores beginning at the head of the list. Upon a cache hit, the hit count is incremented and the segment is relocated, if necessary, using comparisons of scores of next higher segments.

11 Claims, 2 Drawing Sheets

CACHE SYSTEM

BACKGROUND

The present invention relates to computer cache memory devices, and more particularly to a method and system for enhanced utilization of a cache memory.

In modern computer systems, cache memory is commonly used to alleviate main memory latency that results from increasingly fast processor clock speeds exceeding the capabilities of cost-effective large capacity memories. Cache memory refers to a small amount of high-speed memory that is coupled closely to the processor. The cache memory dynamically duplicates a subset of main memory data. When a processor requests data from memory, the high-speed cache memory is first tested and, if found there the data is retrieved from the cache memory and execution resumes; otherwise, the data is obtained from the slower main memory.

Practical considerations dictate that cache memories store only a small subset of the main memory data. Once the cache memory is filled, data must be discarded therefrom in order for new data to be cached. Determining which memory cache locations to discard is a difficult task since it is basically a matter of predicting which cache memory data will be called for in the near future.

Typical replacement schemes include Round-Robin, Robin, Random, Least-Recently-Used (LRU), and Pseudo-Least-Recently-Used (PLRU). These schemes utilize a cache controller to determine which cache memory data gets replaced in response to prior usage, normally on a line-by-line basis. The Round-Robin, or first-in-first-out (FIFO), replacement scheme simply replaces the cache memory lines in a sequential order. When the last cache memory line is reached, the controller starts over from the first memory line.

The Least-Recently-Used (LRU) replacement scheme requires more complex cache control. In the LRU scheme, the assumption is that when a cache memory line has been accessed recently, it will most likely be accessed again in the near future. Based upon this assumption, the cache memory line that has been "least recently used" should be replaced when more room is needed. To implement the LRU scheme, the cache controller marks each cache memory line with a time counter value each time there is a "hit" on that cache memory line. When the cache controller is forced to replace a cache memory line, the cache controller replaces the cache memory line having the oldest time count. In this manner the cache memory line which was "least recently used" gets replaced. The Pseudo-Least-Recently-Used (PLRU) replacement scheme is somewhat similar to the LRU scheme, except that it requires less complex logic and less memory to implement. However, the PLRU scheme employs shortcuts to speed up operation, marking each line at which a cache "hit" occurs with a flag only. When more space is needed, the controller searches for any line for which the flag is not set, performance being compromised in that the least recently accessed cache memory location is often not the location replaced. Further, potential cache lockout from all of the flags being get set at once must be averted such as by arbitrarily clearing all of the flags, further compromising performance.

It is also known to use hit counts and/or frequency as a criteria for block replacement. In addition to these "time-locality" schemes, address-locality is sometimes used, particularly in database applications. Other categories of cache management schemes include application-specific ones that lock or highly prioritize selected data into cache memory.

These and further schemes that use various combinations of the above are not entirely satisfactory, for a number of reasons. For example:

1. They are unavailable in that existing application programs must be rewritten;
2. They are ineffective in that they fail to achieve desired hit ratios and/or access time; and
3. They are undesirably complex and/or wasteful of memory resources.

Thus there is a need for a cache memory system that overcomes the disadvantages of the prior art.

SUMMARY

The present invention meets this need by providing a cache memory system that is prioritized by data block size as well as hit frequency. In one aspect of the invention, the system includes a main computer memory for storing addressable data; a computer processor having a primary memory addresser; a high-speed cache memory for storing subsets of the data of the main computer memory for fast access by the processor; and a cache controller for retrieving addressed data from the cache memory when present therein and duplicating other data in the main computer memory and the cache memory, the system being programmed for maintaining an ordered list of cache items, each item being one subset of the data and having a score and a size associated therewith, items having lowest scores being selectively removed from the list for accommodation of freshly addressed subsets of the data, and wherein each score is positively correlated to a frequency of access of the item and negatively correlated with the size of the item, the size being proportional to a number of memory addresses required for holding that subset of the data.

The score can be directly proportional to the frequency of access. The frequency of access can be determined as a number of accesses of the item beginning with an initial access from which the item remains in the ordered list. Alternatively, the frequency of access can be determined as a number of accesses of the item during a fixed period of time.

The ordered list can have an associated overhead for each item that is proportional to a number of memory addresses used for storing cache memory management information that includes the size, frequency of access, and other information selected from the set consisting of object pointer, next list pointer, previous list pointer, stack pointer, heap pointer, and fixed length management code, the score being inversely proportional to the size plus the overhead. The score can be proportional to the frequency of access divided by the size plus the overhead.

In another aspect of the invention, a method for rapidly accessing repetitively accessed addressable data and other addressable data from a main memory and a smaller and faster cache memory includes the steps of:

(a) forming an index of previously accessed items of data;
(b) selectively adding items corresponding to newly addressed data to the index;
(c) copying the newly addressed data of the added items from the main memory into the cache memory;
(d) determining an item score being positively correlated with a frequency of access of the item and negatively correlated with a size of the corresponding item;
(e) selectively deleting from the index items having lowest scores for accommodating the added items of newly addressed data; and (f) accessing addressed data from the cache memory when the addressed data corresponds to items present in the index.

The method can include the further step of ordering the index by locating items having higher scores ahead of items having lower scores. The step of determining the item score can include the steps of adding a memory overhead corresponding to item index storage to a memory size of corresponding addressed data to form a sum, and dividing a frequency count by the sum. The step of determining the item score can further include the step of incrementing the frequency count upon each request for the item.

In a further aspect of the invention, the method includes the steps of:

(a) forming a linked list of previously accessed items of data;

(b) selectively adding items corresponding to newly addressed data to the linked list;

(c) copying the newly accessed data of the added items from the main memory into the cache memory;

(d) determining a total item size as a sum of a number of memory locations occupied by the requested data and a number of memory locations associated with the linked list for the requested data;

(e) determining a frequency of access of the item by incrementing a frequency count upon each request for the item;

(f) scaling the frequency count;

(g) dividing the scaled frequency count by the total size to form a score;

(h) ordering the linked list by locating items having higher scores ahead of items having lower scores;

(i) selectively deleting from the list items having lowest scores for accommodating the added items of newly addressed data; and (j) accessing addressed data from the cache memory when the addressed data corresponds to items present in the list.

DRAWINGS

These and other features, aspects, and advantages of the present invention will become better understood with reference to the following description, appended claims, and accompanying drawings, where:

DESCRIPTION

Figure 1:
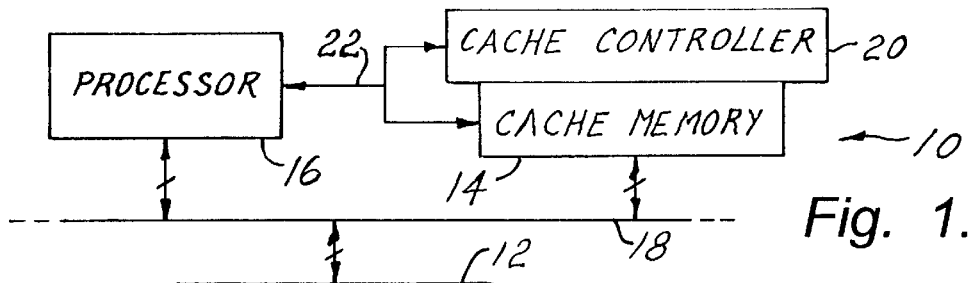
FIG. 1 is a block diagram showing a portion of a computer system including bus-interfaced main and cache memories and a processor, the cache memory being implemented according to the present invention.

The present invention is directed to a computer cache memory system that is particularly effective in many applications involving the transfer of variously sized blocks of information. With reference to FIGS. 1–7 of the drawings, a computer system 10 includes a main memory 12, a cache memory 14 and a processor 16 coupled to a main bus 18. The processor 16 issues memory requests to a dedicated cache controller 20 of the cache memory 14. If the information is available in the cache memory 14, the requested information is forwarded immediately to the processor 16 via a dedicated cache bus 22. If the information is not located in the cache memory 14, the request is forwarded to the slower main memory 12, which provides the requested information to processor 16 via the bus 18. It will be understood that in some applications, the cache memory 14 is interposed between the processor 16 and the main bus 22, in which case all data for the processor 16 that is retrieved from the main memory 12 is first copied into the cache memory 14, being from there accessed by the processor 16.

Figure 2:
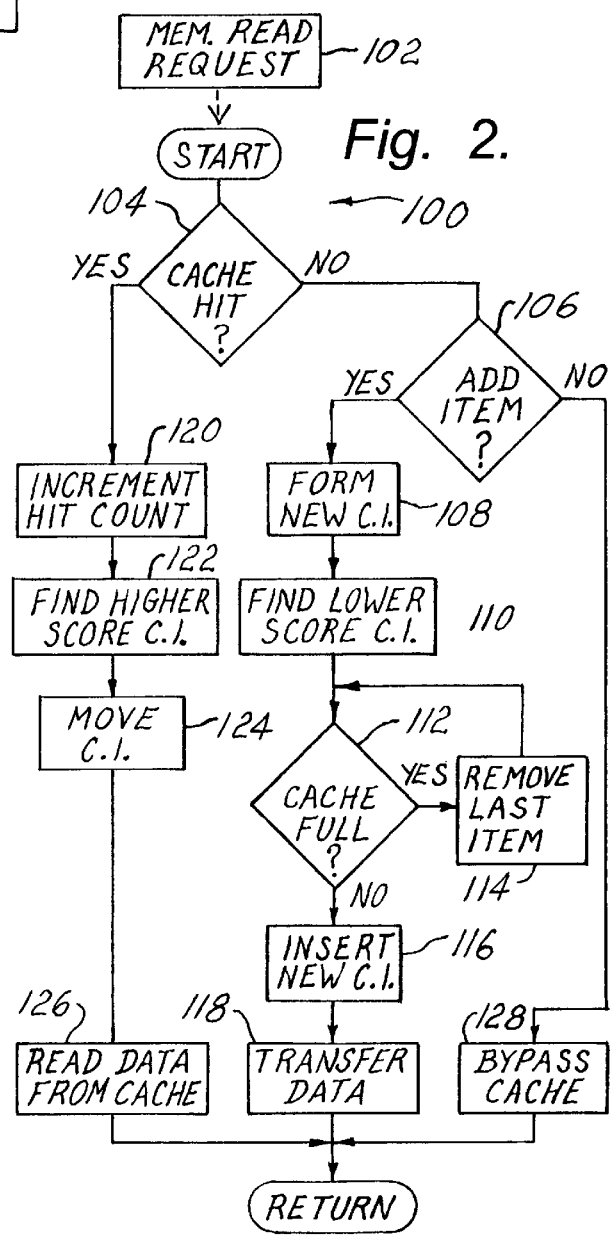
FIG. 2 is a cache memory program flow chart for the system of FIG. 1.
Figure 3:
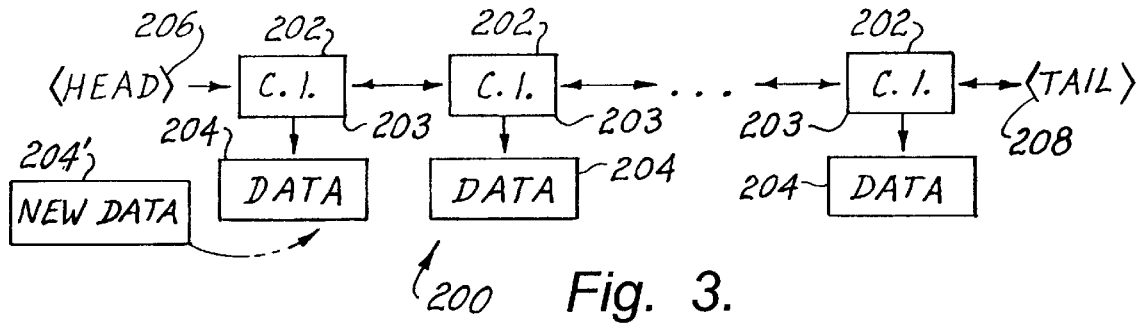
FIG. 3 is a block diagram of a linked list of cache memory data in the system of FIG. 1, with new data to be incorporated therein.
Figure 4:
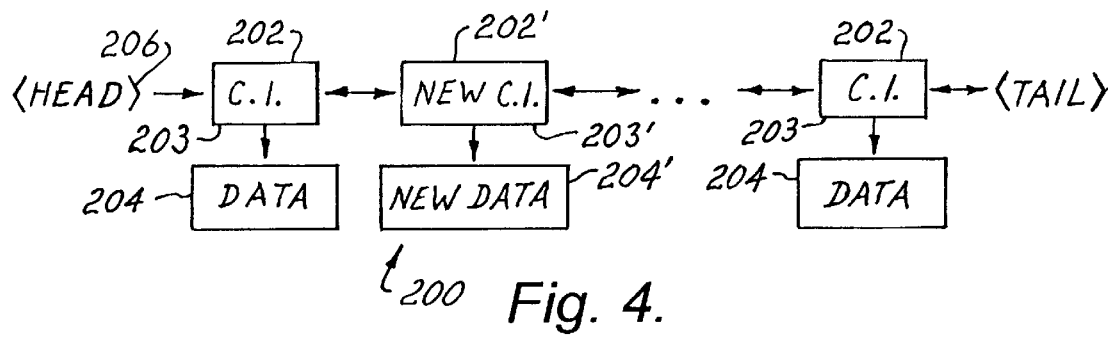
FIG. 4 is a block diagram as in FIG. 3, showing the new data added to the linked list.

The system 10 includes a cache manager program 100 (FIG. 2) for controlling transfers of data from the main memory 12 to the cache memory 14, and for determining deletions of transferred data from the cache memory 14 to accommodate new data. According to the present invention, the cache manager program 100 ranks cache data using scores that are oppositely correlated relative to size and frequency of access, in a manner favoring replacement of larger blocks of infrequently accessed data. Conversely, the invention provides cache retention of smaller blocks that are more frequently requested. In an exemplary implementation of the present invention, the program 100 maintains a linked list 200 of cache items 202, each cache item 202 having a C.I. list segment 203 and an associated data block 204 as shown in FIG. 3, the data block 204 having been copied from a number of contiguous address locations of the main memory 12. The linked list 200 has a head 206 and a tail 208, each of the list segments 203 having appropriate pointers to the corresponding data block, the next preceding segment 203 (or the head 206), and to the next succeeding segment 203 (or the tail 208). The cache items 202 are ordered according to respective scores as described below, the scores being used to implement a cache replacement scheme according to the present invention. As further shown in FIG. 3, from time to time a new data block 204' is required to be added to the cache memory 14, the list 200 being correspondingly altered. As shown in FIG. 4, a new list segment 203' is formed for the new data block 204', a freshly formed cache item including the list segment 203' and the data block 204' being designated 204' in FIG. 4. It will be understood that once the fresh cache item 202' is complete, it has full correspondence with the other items 202, the primed designations being no longer necessary. It will be further understood that the actual copying of the new data 204' into the cache memory 14 can precede or follow the formation of the new list segment 203'.

Figure 7:
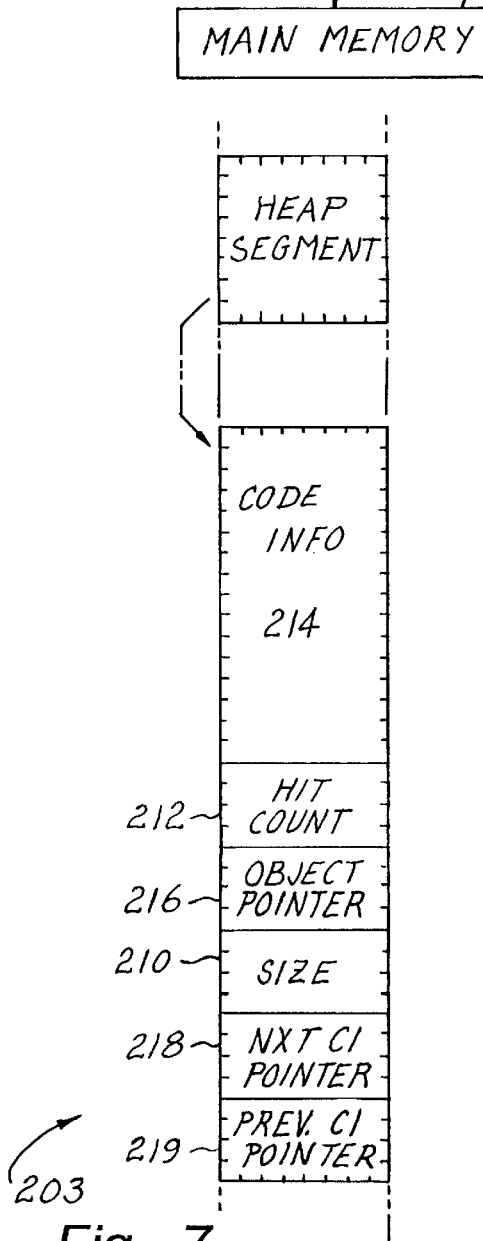
FIG. 7 is a memory diagram for a segment of the linked lists of FIGS. 3–6.

As introduced above, the scores are oppositely correlated relative to size and frequency of access of the data blocks 204. Accordingly, the list segments 203 of the linked list 200 carry parameters of size 210 and count 212 as shown in FIG. 7, the count 212 being typically incremented upon each occurrence of a hit on the associated cache item 202. Other elements of each segment 203 are a code phrase 214, an object pointer 216, a next CI pointer 218, and a previous CI pointer 219. The code phrase 214 includes a main memory address of the associated data block 204, in addition to optional elements that form no part of the present invention. The object pointer 216 contains a cache address of the data block 204; the next CI pointer 218 contains the address of the list segment 203 having the next higher score (or the head 206 if there is none); and the previous CI pointer 219 contains the address of the list segment 203 having the next lower score (or the tail 208 if there is none). In an exemplary configuration of the list segment 203, the code phrase 214 occupies 16 bytes, and the size 210, the hit count 212, the object pointer 216, and the CI pointers 218 and 219 each occupy 4 bytes, a total of 36 bytes. Also, a heap segment 220 that is associated with each list segment 203 can occupy 8 bytes, there being thus a total "CACHE_OVERHEAD" of 44 bytes for each data block 204. The sum of the size 210 and the CACHE_OVERHEAD is sometimes referred to herein as "GSIZE".

In one preferred implementation of the present invention, cache item scores are each determined as a scaled ratio of the count 212 and GSIZE, the scores being thus directly proportional to the count 212 and inversely proportional to GSIZE, where higher scores favor retention of cached data and lower scores favor replacement. When the count 212 is maintained as the number of times the data of the cache item 202 has been requested from the cache memory 14, the count 212 corresponds to the number of requests for that data that have been encountered over an interval of time that the data has been present in the cache memory 14, being thus positively correlated to a time frequency of the requests. The scores as determined above are both positively correlated to frequency and negatively correlated to size, GSIZE being positively correlated to the size 212. By determining the scores negatively correlated to block size, the system 10 of the present invention provides enhanced cache memory efficiency by keeping a larger number of smaller data blocks available for rapid access by the processor 16 than otherwise. For example, caching ten small items that each get ten hits is more efficient than caching one large item that gets twenty hits. Further, the use of the sum GSIZE avoids excessive cache memory consumption by overhead associated with the linked list 200, in that the overhead is included in the scores.

An exemplary configuration of the cache manager program 100 is activated when the processor 16 makes a memory read request 102. Initially, the presence or absence of the requested data in the cache memory 14 is tested in a cache hit step 104 as shown in FIG. 2. Upon a cache miss, control is transferred to an optional test item step 106, further described below, for determining whether the requested item should be copied into the cache memory 14. It will be understood that the test item step 106 would not be done in configurations of the computer system 10 having the cache memory 14 interposed between the processor 16 and the main bus 18 (pipeline cache). Unless the requested item is not to be cached, a new C.I. for the data is created in a form list segment step 108, the resulting new list segment 203' corresponding to the list segment 203 as shown in FIG. 7. A proper location for insertion of the new list segment 203' into the linked list 200 is next determined in a find lower score step 110, by sequentially comparing the score of the new data block 203' with scores of other segments 203, beginning from the head 206 of the list 200.

Before adding the new list segment 203', a test cache step 112 is executed for determining whether sufficient room exists for the segment 203' as well as the new data block 204' in the cache memory 14. If not, the last cache item 202 (adjacent the tail 208) is removed in a clear cache step 114, followed by repetition of the test cache step 112. Once sufficient cache space is verified, the new list segment 203' is added to the linked list 200 in an insert segment step 116, followed by actual copying of the requested data into the cache memory 14 in a transfer data step 118, the data also being received by the processor 16 as further described below.

Figure 5:
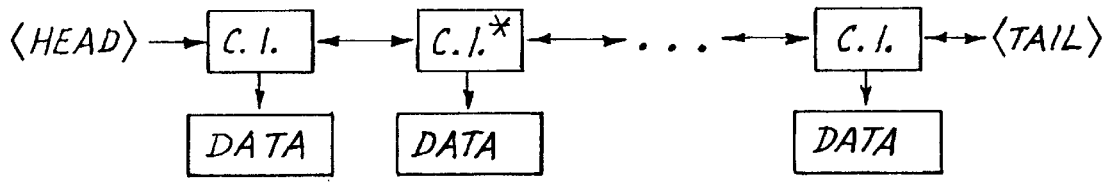
FIG. 5 is a block diagram of the linked list of FIG. 3, showing a cache hit condition.
Figure 6:
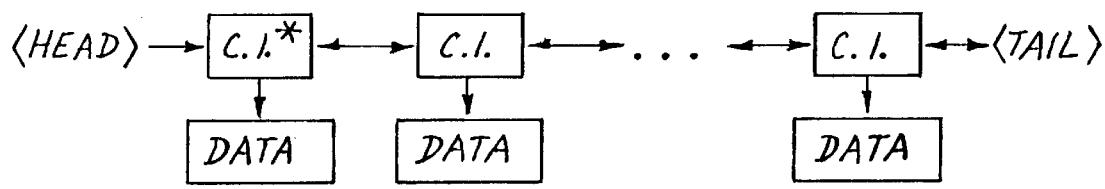
FIG. 6 is a block diagram as in FIG. 5, showing the linked list reordered in response to the hit condition.

FIGS. 5 and 6 show management of the linked list 200 when requested data is already present in the cache memory 14. In the case of a cache hit (affirmative result of the cache hit step 104), control is transferred to an increment count step 120 for incrementing the hit count 212 of the corresponding list segment, designated hit segment 203* in FIGS. 5 and 6. Alternatively, the count can be implemented to reflect a true time frequency as a scaled quotient of hit counts and elapsed time. A new location for insertion of the hit segment 203* in the linked list 200 is next determined in a find higher score step 122, by sequentially comparing the score of the hit segment 203* with scores of other segments 203, beginning the nest higher segment 203. Then, the hit segment 203* is relocated (if necessary to maintain the scores in descending order) in a move segment step 124 and, finally, the requested data is read from the corresponding data block 204 in a read data step 126, whereupon control is returned to the calling process. Exemplary pseudo C-language code for portions of the cache manager program 200, including the steps 110, 112/114, 116, 120, 122, and 124, is listed below:

```
#define CACHE_OVERHEAD 32 /* 40_10 */
#define SCORE_ITEM(tmp) ((item—>hit_count << 10) /
                         (Item—>size + CACHE_OVERHEAD))
/* where hit_count is the number of times this item has been
requested from the cache, and size is the size in bytes of
the cache item */
void Cache_insert_item(cache_item *item)
{
    /* drop entries off end of cache if necessary to
make room */
    free_space(item—>size);
    cache_item *tmp = cache_head;
    while (SCORE_ITEM(tmp) > SCORE_ITEM(item))
        tmp = tmp—>next;
    /* insert item into linked list just before tmp */
    insert_entry(tmp, *item);
void Cache_hit_item(cache_item *item)
{
    delete entry(item);
    item—>hit-count ++;
    Cache_insert_item(item);
}
```

In summary, cache items are kept in an ordered linked list. The order is determined by item scores, being the respective frequency count, multiplied by 1024 and divided by the corresponding total item size in memory. When space is needed in the cache, items with lowest scores are deleted from the cache.

In the illustrated implementation of the cache manager program 100, from a negative result of the test item step 106, control is passed to a bypass cache step 128, wherein the requested data is obtained for the processor 16 from the main memory 12. It will be understood that the test cache step 112 and the clear cache step 114 can be combined with the test item step 106 (in non-piped cache implementations as in the system configuration of FIG. 1). Thus, a score associated with requested data would be compared first with that of the last cache item 202 (adjacent the tail 208), cache space being cleared as necessary prior to the form list segment and find lower score steps 108 and 110. Conversely, in piped cache implementations, the transfer data step 118 can be combined with the read data step 126, the data being first copied into, then read from the cache memory 14.

Significantly improved cache memory efficiency has been successfully demonstrated in testing of the present invention. Particularly, the cache management program 100 was implemented and tested on a COMPAQ PC computer having an INTEL® 75 MHz PENTIUM® processor (16) including 256 KB cache memory (14) with 32 MB RAM main memory (12), using the MICROSOFT® WINDOWS® NT 4.0 operating system, and a VERSANT® ODBMS (Object Database Management System) Release 4, the program 100 being compiled under MICROSOFT Visual C++4.2. (COMPAQ, INTEL, and MICROSOFT are commonly known suppliers of personal computers, processors, and software, respectively, being owners of the indicated trademarks. VERSANT is a registered trademark of Versant Object Technology of Menlo Park, Calif.) The computer system 10 as implemented above was benchmarked while processing Internet web pages having sizes ranging typically between 1K bytes and 50K bytes. The test results showed an improvement in hit ratio from 84% using conventional cache control (frequency-based replacement) to 98% using the cache manager program 100, a reduction of cache misses from 16% to only 2% (a factor of 8).

It is believed that the computer system 10 of the present invention, in addition to providing significantly reduced overall memory latency using a given capacity of the cache memory 14, enables comparable performance with significantly reduced cache memory capacity, particularly in that cache memory speed can generally be increased when the capacity can be reduced. For example, when the speed of the main memory 12 (or other source of data being requested) is heavily influenced by latency (as in typical local area networks and web servers), it is believed that comparable speed is provided by the present invention with the capacity of the cache memory 14 being from approximately 50% to approximately 70% of that required under conventional cache management.

The present invention thus provides significant improvements in overall speed and/or required cache memory capacity, without regard to the content or organization of the requested data, and without requiring application programs to prioritize memory accesses.

Although the present invention has been described in considerable detail with reference to certain preferred versions thereof, other versions are possible. Therefore, the spirit and scope of the appended claims should not necessarily be limited to the description of the preferred versions contained herein.

What is claimed is:

1. A cache memory system comprising:
   (a) a main computer memory for storing addressable data;
   (b) a computer processor having a primary memory addresser;
   (c) a high-speed cache memory for storing subsets of the data of the main computer memory for fast access by the processor; and
   (d) a cache controller for retrieving addressed data from the cache memory when present therein and duplicating other data in the main computer memory and the cache memory,
the system being programmed for maintaining an ordered list of cache items, each item being one subset of the data and having a score and a size associated therewith, items having lowest scores being selectively removed from the list for accommodation of freshly addressed subsets of the data, and wherein each score is positively correlated to a frequency of access of the item and negatively correlated with the size of the item, the size being proportional to a number of memory addresses required for holding that subset of the data.

2. The cache memory system of claim 1, wherein the score is directly proportional to the frequency of access.

3. The cache memory system of claim 2, wherein the frequency of access is determined as a number of accesses of the item beginning with an initial access from which the item remains in the ordered list.

4. The cache memory system of claim 2, wherein the frequency of access is determined as a number of accesses of the item during a fixed period of time.

5. The cache memory system of claim 1, wherein the ordered list has an associated overhead for each item, the overhead being proportional to a number of memory addresses used for storing cache memory management information, the management information including the size, frequency of access, and other information selected from the set consisting of object pointer, next list pointer, previous list pointer, stack pointer, heap pointer, and fixed length management code, the score being inversely proportional to the size plus the overhead.

6. The cache memory system of claim 5, wherein the score is proportional to the frequency of access divided by the size plus the overhead.

7. A method for rapidly accessing repetitively accessed addressable data and other addressable data from a main memory and a smaller and faster cache memory, comprising the steps of:
   (a) forming an index of previously accessed items of data;
   (b) selectively adding items corresponding to newly addressed data to the index;
   (c) copying the newly addressed data of the added items from the main memory into the cache memory;
   (d) determining an item score being positively correlated with a frequency of access of the item and negatively correlated with a size of the corresponding item;
   (e) selectively deleting from the index items having lowest scores for accommodating the added items of newly addressed data; and
   (f) accessing addressed data from the cache memory when the addressed data corresponds to items present in the index.

8. The method of claim 7, comprising the further step of ordering the index by locating items having higher scores ahead of items having lower scores.

9. The method of claim 7, wherein the step of determining the item score includes the steps of adding a memory overhead corresponding to item index storage to a memory size of corresponding addressed data to form a sum, and dividing a frequency count by the sum.

10. The method of claim 9, wherein the step of determining the item score further comprises the step of incrementing the frequency count upon each request for the item.

11. A method for rapidly accessing repetitively accessed addressable data and other addressable data from a main memory and a smaller and faster cache memory, comprising the steps of:
   (a) forming a linked list of previously accessed items of data;
   (b) selectively adding items corresponding to newly addressed data to the linked list;
   (c) copying the newly accessed data of the added items from the main memory into the cache memory;
   (d) determining a total item size as a sum of a number of memory locations occupied by the requested data and a number of memory locations associated with the linked list for the requested data;

(e) determining a frequency of access of the item by incrementing a frequency count upon each request for the item;

(f) scaling the frequency count;

(g) dividing the scaled frequency count by the total size to form a score;

(h) ordering the linked list by locating items having higher scores ahead of items having lower scores;

(i) selectively deleting from the list items having lowest scores for accommodating the added items of newly addressed data; and (j) accessing addressed data from the cache memory when the addressed data corresponds to items present in the list.

* * * * *